Figure 1:
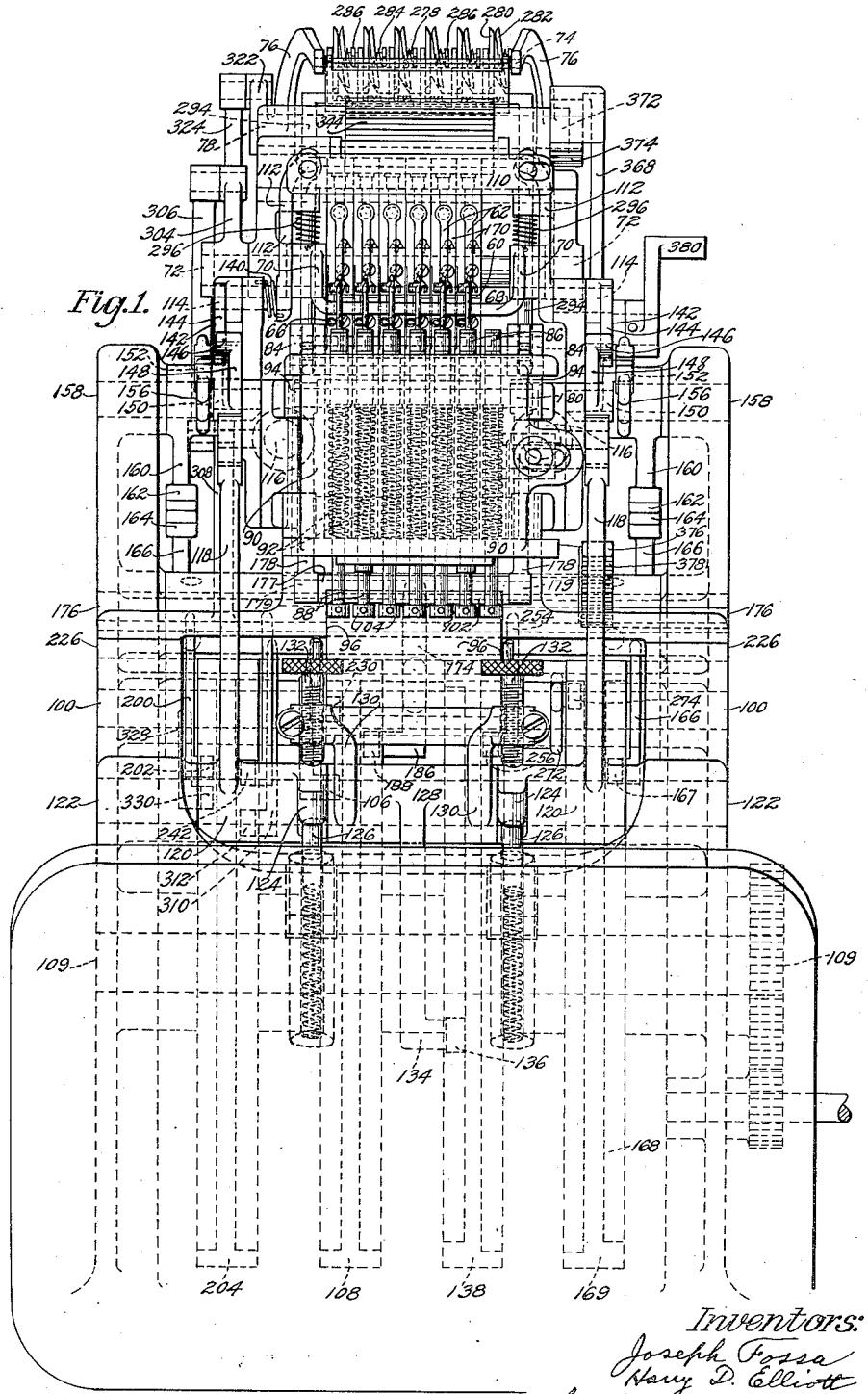

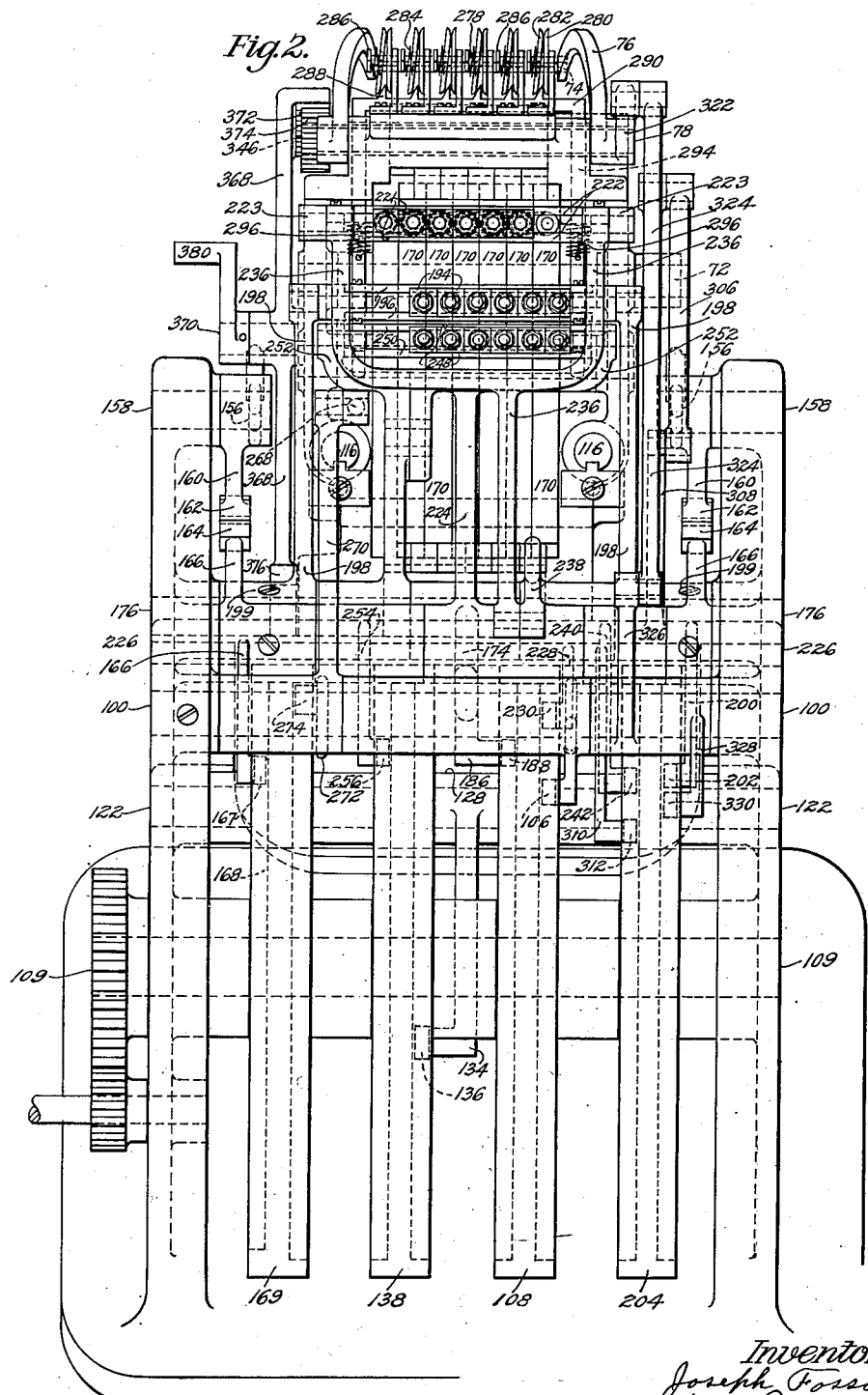

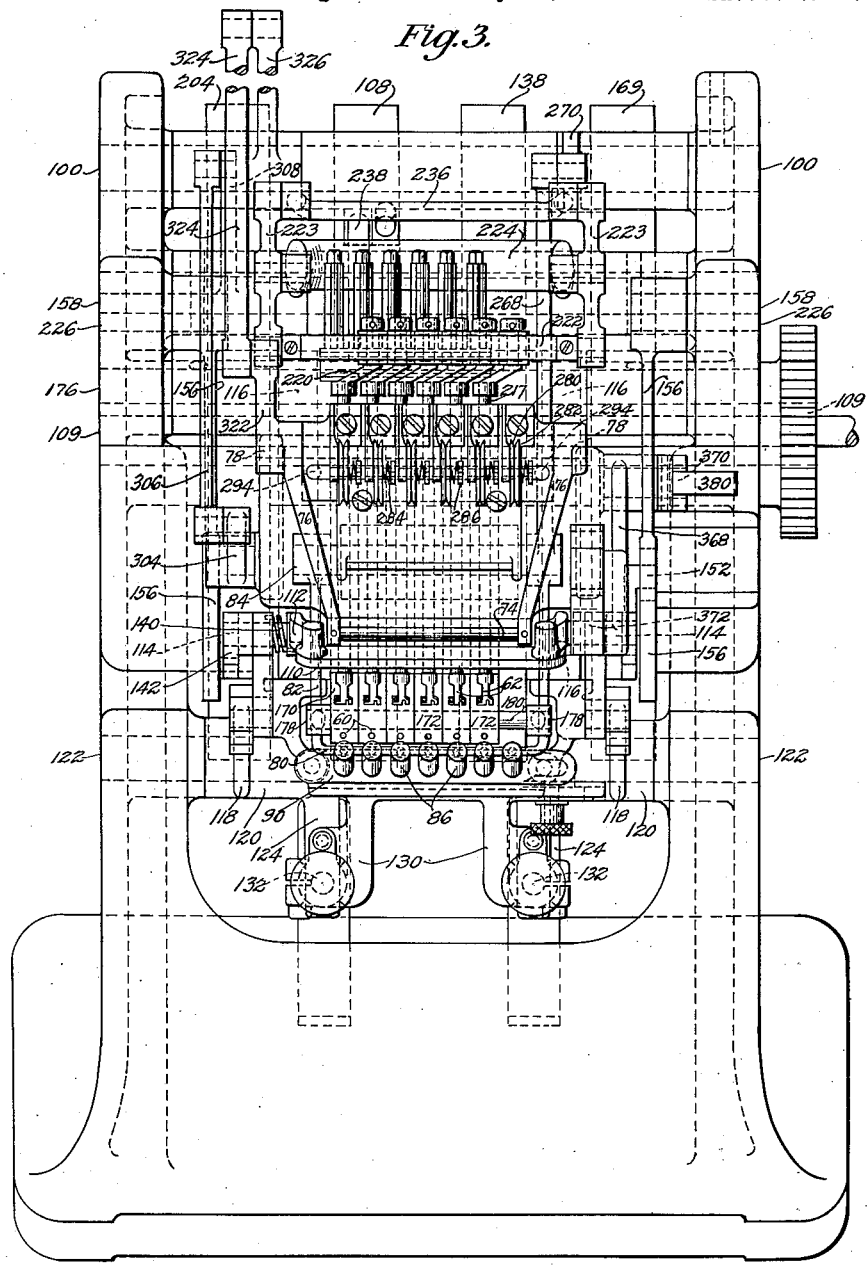

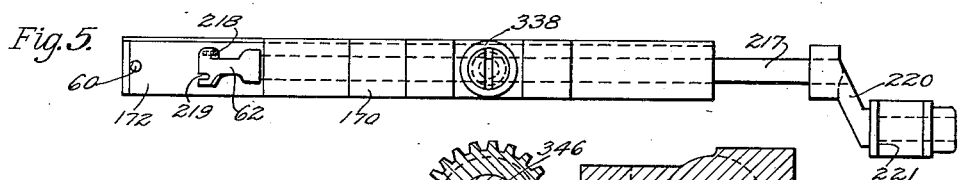
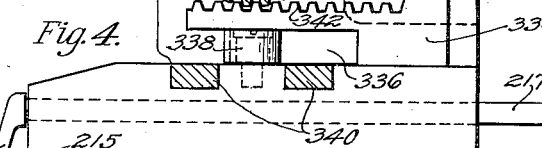
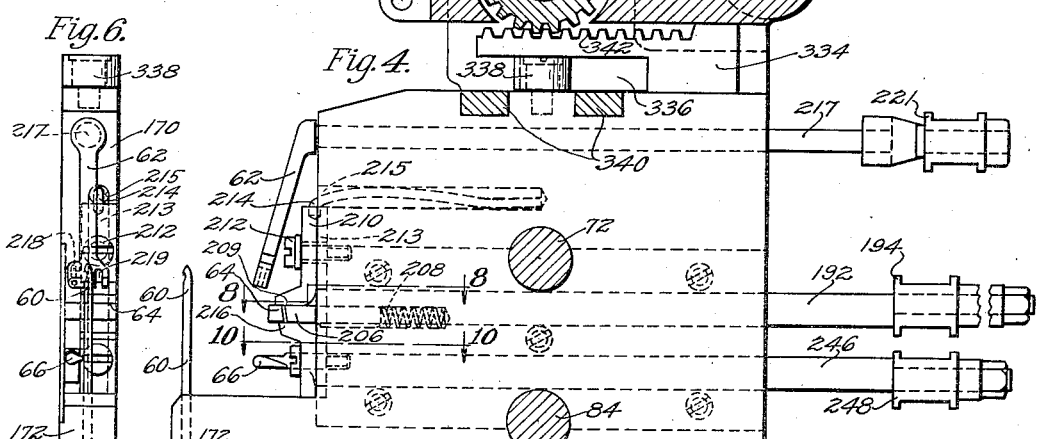
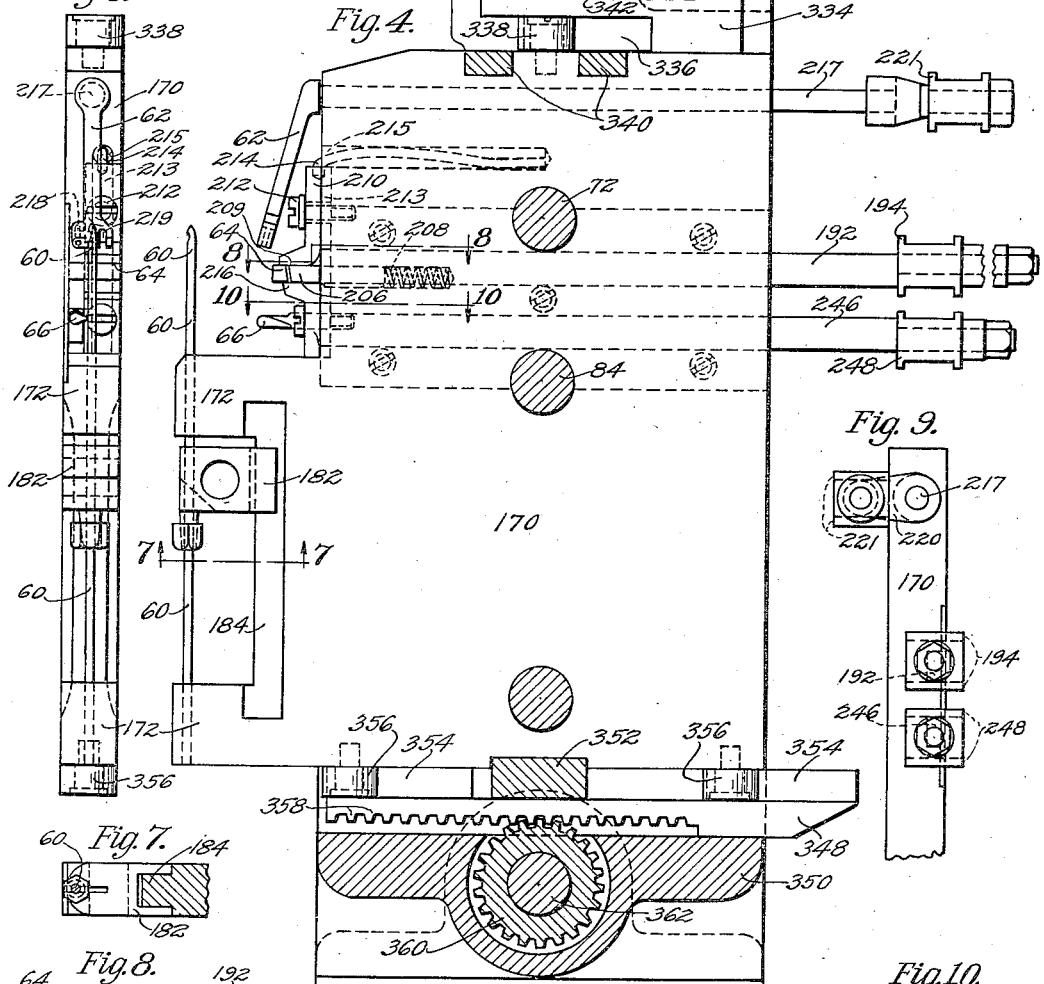
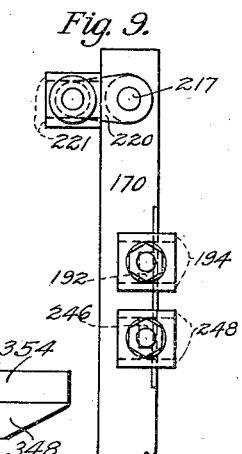
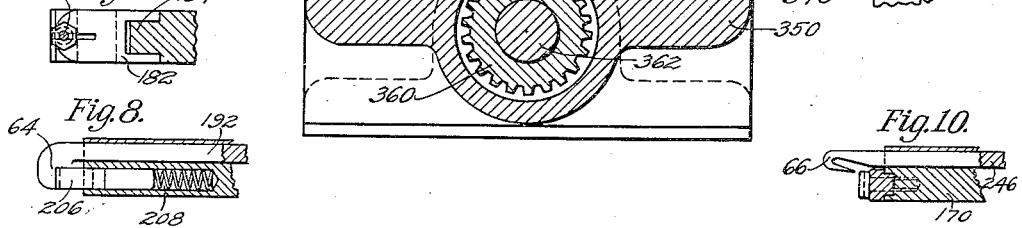

Oct. 13, 1936.    J. FOSSA ET AL    2,056,961
MACHINE FOR LACING SHOE UPPERS
Original Filed May 15, 1930    11 Sheets-Sheet 5
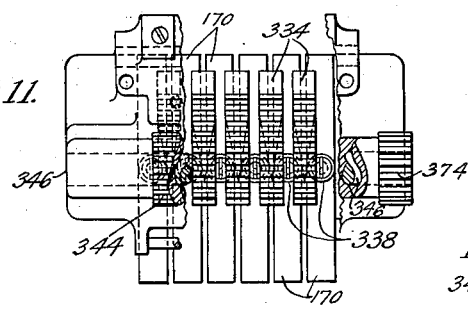
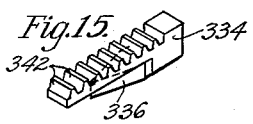
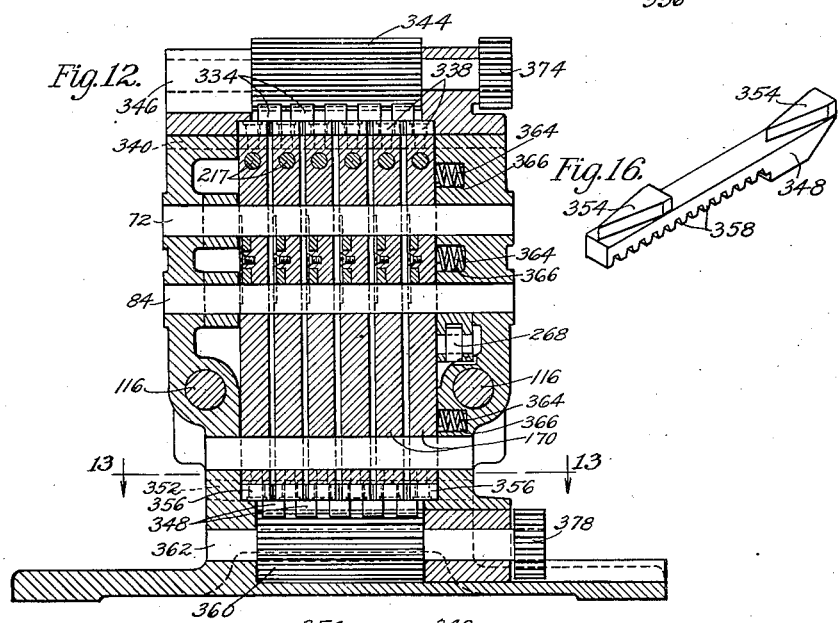
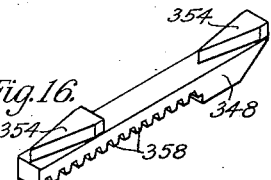
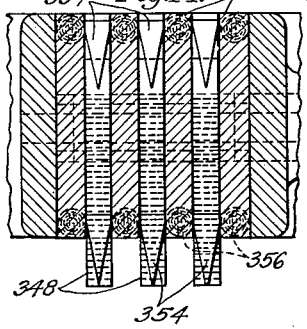
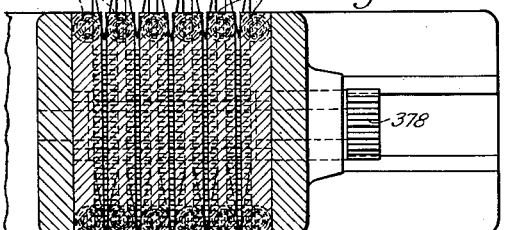

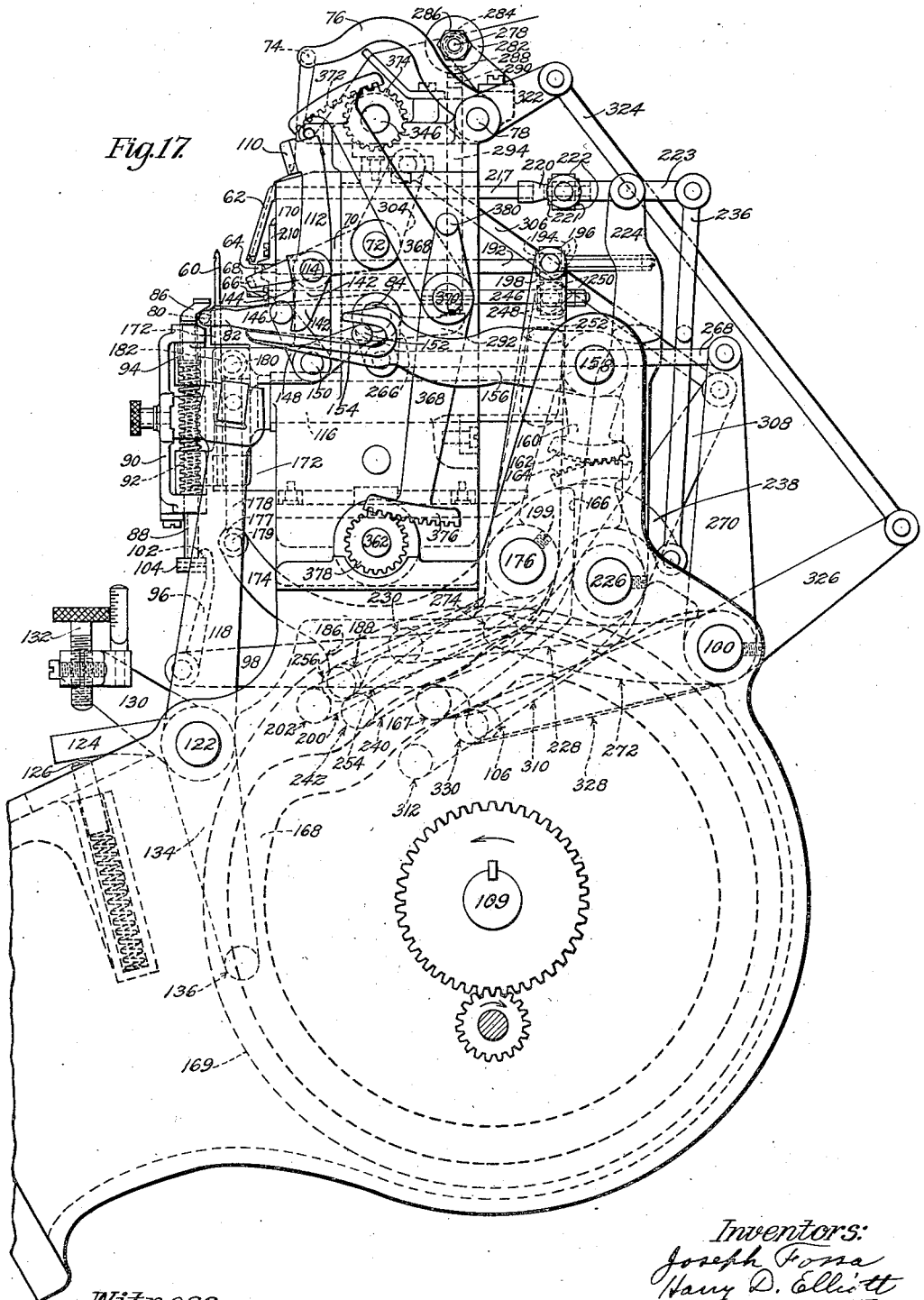

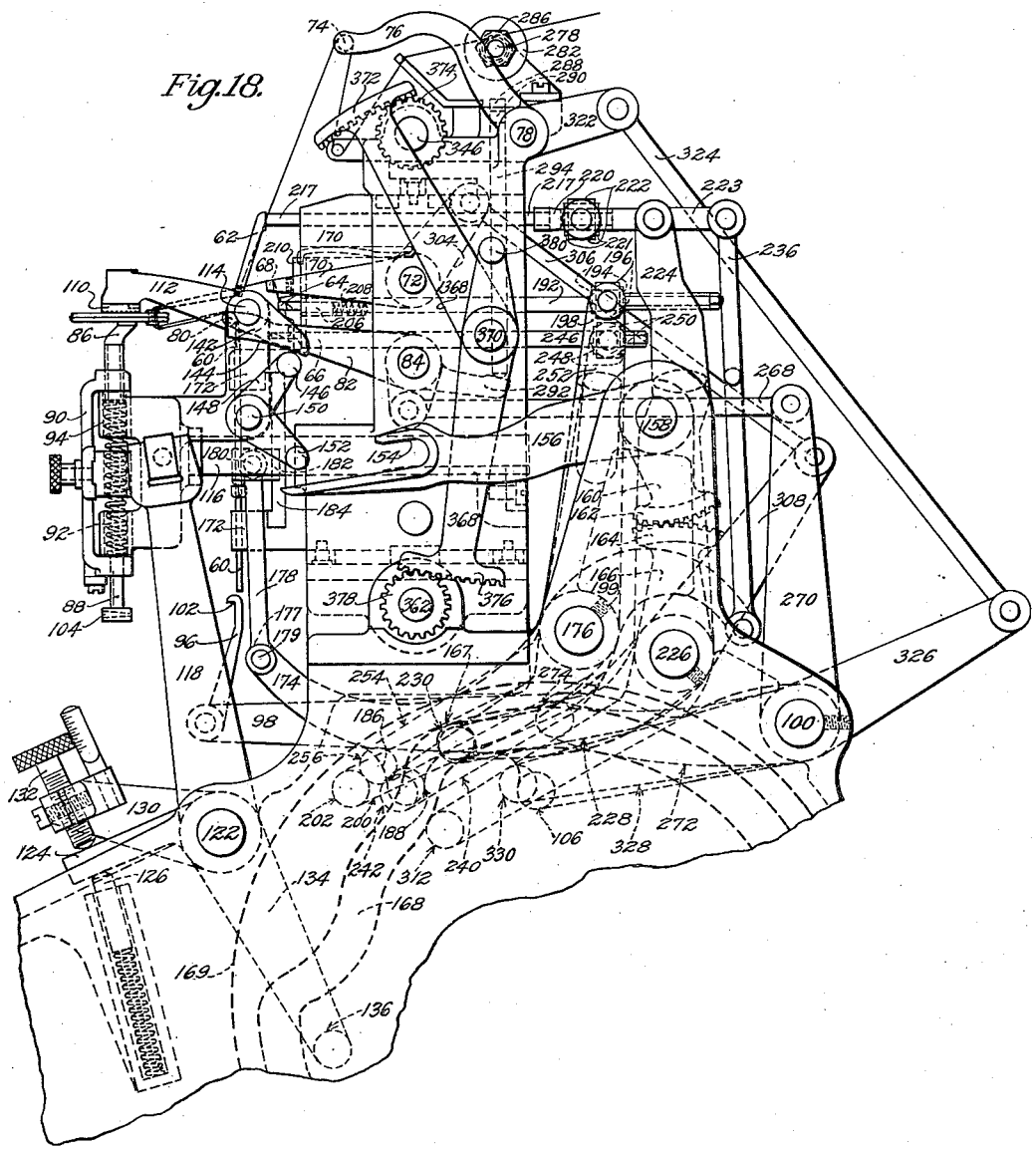

Oct. 13, 1936.  J. FOSSA ET AL  2,056,961
MACHINE FOR LACING SHOE UPPERS
Original Filed May 15, 1930  11 Sheets-Sheet 8
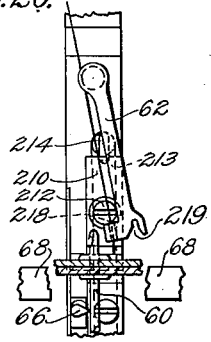
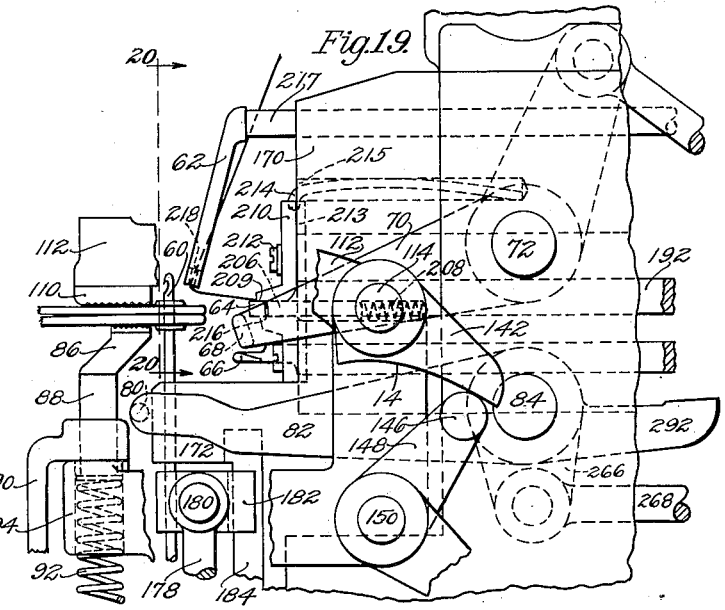
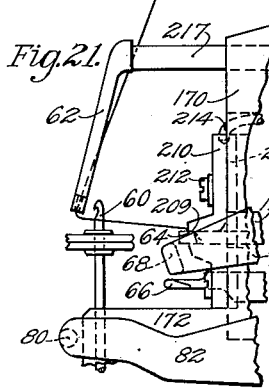
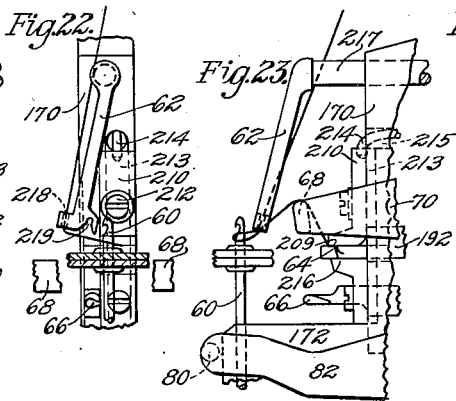
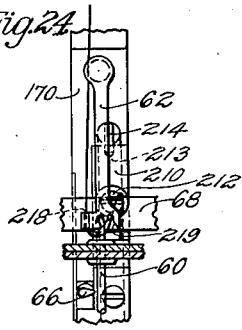

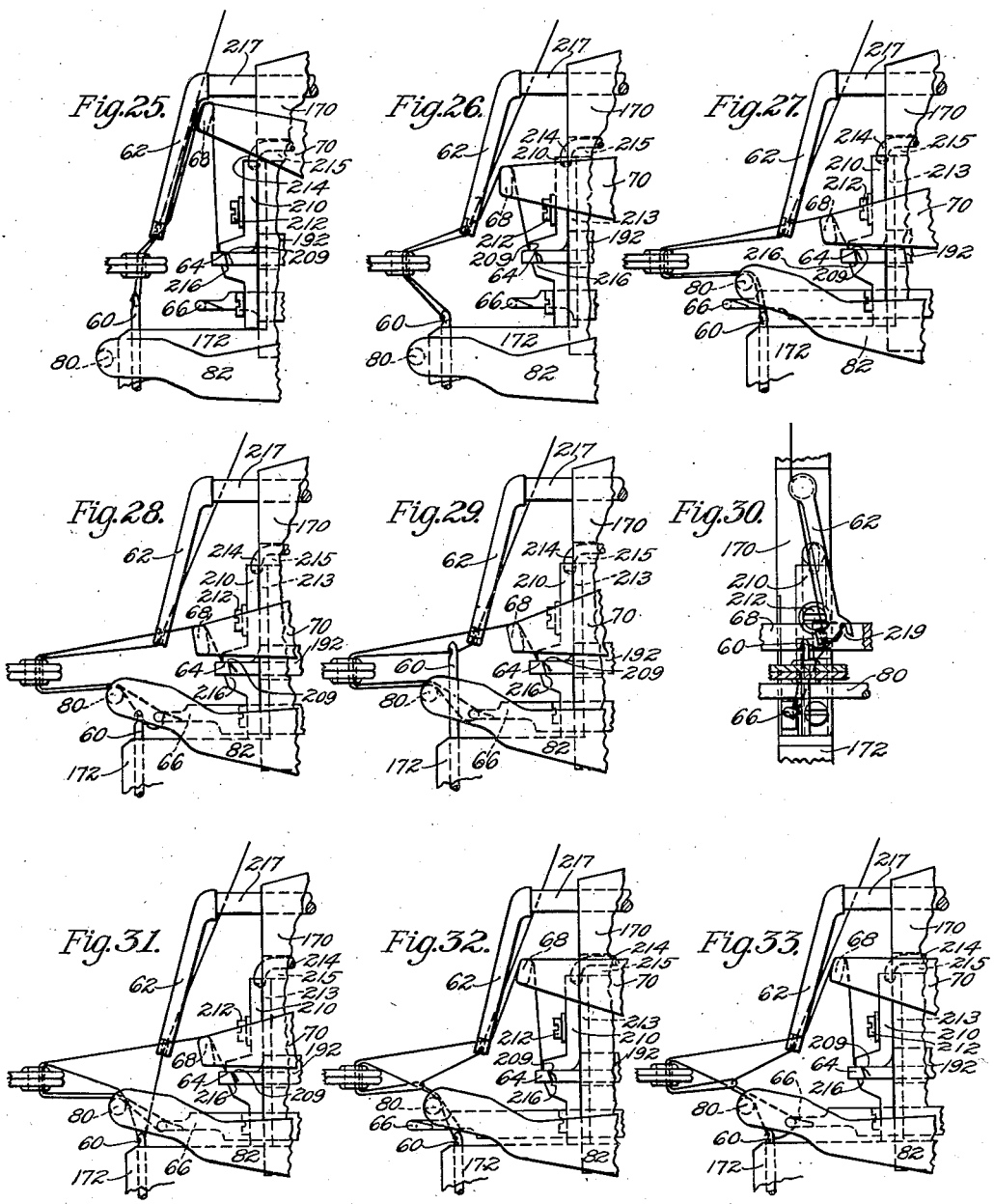

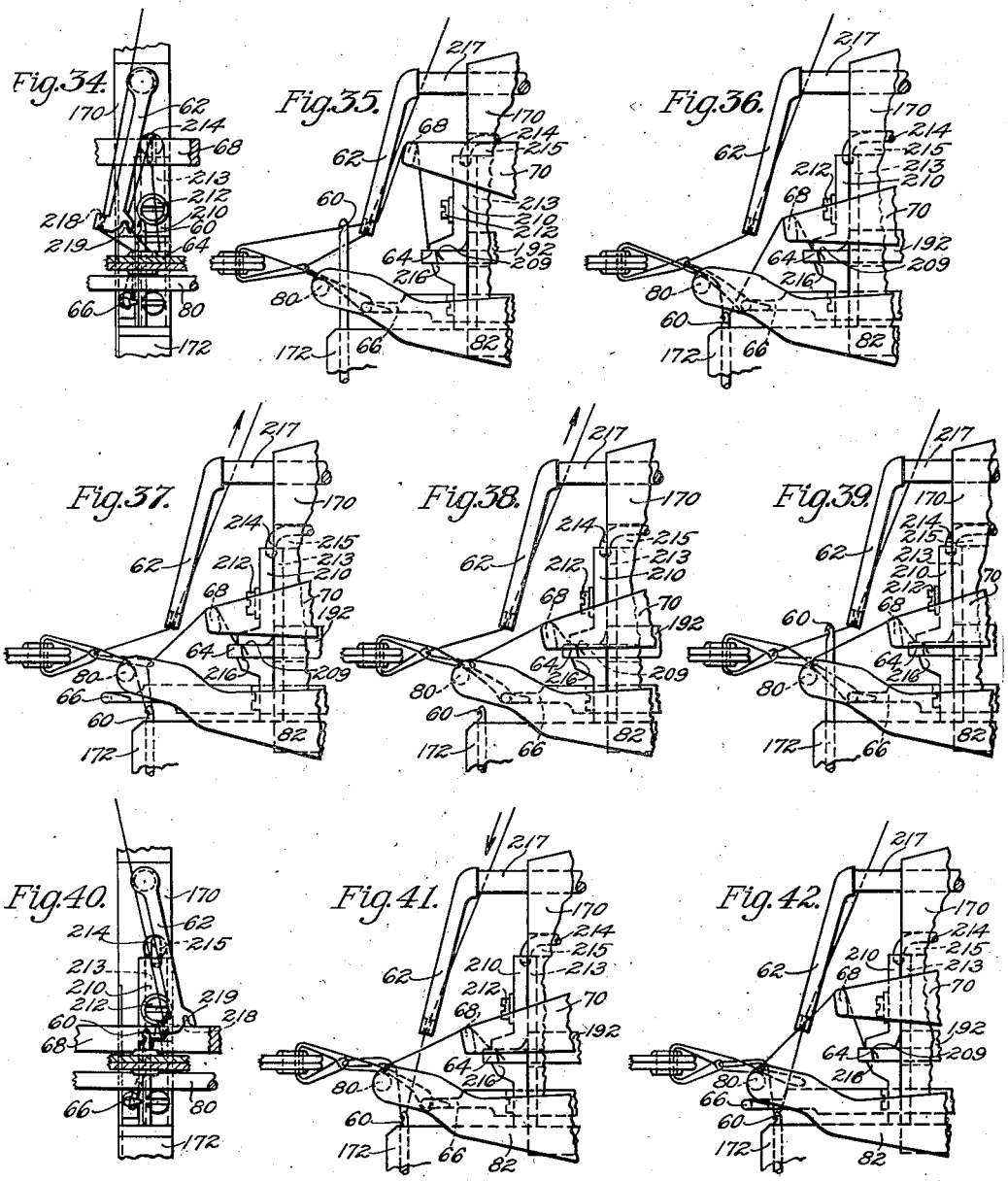

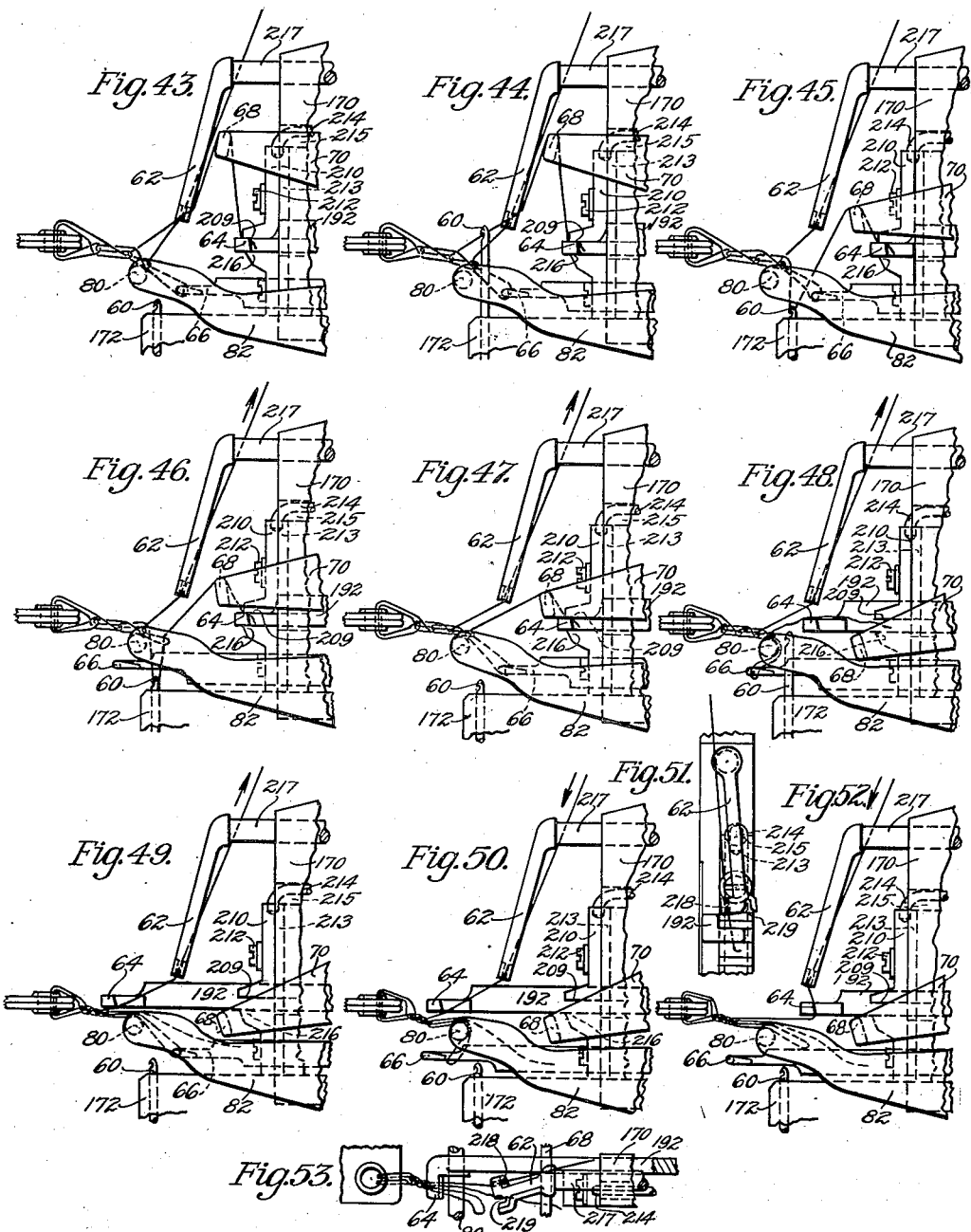

Patented Oct. 13, 1936

2,056,961

UNITED STATES PATENT OFFICE 2,056,961

MACHINE FOR LACING SHOE UPPERS

Joseph Fossa, Danvers, and Harry D. Elliott, Beverly, Mass., assignors to United Shoe Machinery Corporation, Paterson, N. J., a corporation of New Jersey Application May 15, 1930, Serial No. 452,764
Renewed February 7, 1935

26 Claims. (Cl. 112—5)

The invention relates to a machine for lacing shoe uppers.

In lacing machines heretofore devised intended to tie individual lacings through each pair of eyelets, carefully adjusted as to length to cause the upper to fit accurately and snugly on a last, difficulty has been encountered in fastening together the two ends of the cord in such a manner as to form a sufficiently short lacing which will not stretch when the upper is opened out and pulled down over the last. The knots previously developed for fastening together the ends of the lacings on these machines tend to slip or turn over and give up a portion of the cord when the upper is opened out and pulled down over the last.

It is, therefore, an object of the present invention to provide a novel and improved machine for tying lacings in shoe uppers preparatory to the lasting operation adapted to form a particularly strong lacing which may be made as short as desired and which will not stretch when opened out and pulled down over the last.

A further object of the invention is to provide a novel and improved machine of the character above referred to adapted for inserting individual lacings of a predetermined length in each pair of eyelets.

With these and other objects in view, the several features of the invention consist in the devices, combinations and arrangement of parts hereinafter described and claimed which, together with the advantages to be obtained thereby, will be readily understood by one skilled in the art from the following description taken in connection with the accompanying drawings in which Fig. 1 is a view in front elevation of a gang lacing machine embodying the several features of the present invention; Fig. 2 is a view in rear elevation of the machine; Fig. 3 is a plan view of the machine; Fig. 4 is a detail view partly in section of one of the knot tying units and the mechanism for positioning the units to correspond with the width of the eyelets; Fig. 5 is a plan view of the unit, illustrating particularly the looper; Fig. 6 is a view in front elevation of the unit shown in Fig. 4; Fig. 7 is a detail view partly in section taken on the line 7—7 of Fig. 4 and looking upwardly; Fig. 8 is a detail sectional view taken on the line 8—8 of Fig. 4; Fig. 9 is a view in rear elevation of the upper portion of the unit illustrated in Fig. 4; Fig. 10 is a sectional view taken on the line 10—10 of Fig. 4; Fig. 11 is a plan view of the assembly of knot tying units illustrating particularly the wedge members for positioning the units laterally to register with the eyelets; Fig. 12 is a sectional view in front elevation of the units and positioning mechanism; Fig. 13 is a sectional view taken on the line 13—13 of Fig. 12; Fig. 14 is a view similar to Fig. 13 with four units instead of six in the machine; Fig. 15 is a perspective view of one of the upper wedges; Fig. 16 is a perspective view of a corresponding lower wedge; Fig. 17 is a view in right side elevation of the machine showing the parts in raised position; Fig. 18 is a view similar to Fig. 17 with an upper clamped in position and moved forwardly out of line with the needle preparatory to tying the knot; Fig. 19 is a view similar to Figs. 17 and 18 with the parts at an intermediate step in the operation prior to the passing of the first loop around the needle hook; and Figs. 20 to 53 inclusive illustrate the relative positions taken by the cord handling elements at successive steps in the operation of tying the knot.

The gang lacing machine herein disclosed as embodying the several features of the invention comprises a series of knot tying units which are adapted to tie individual lacings in each pair of eyelets of a folded upper. The instrumentalities by means of which the upper is held and the knot is tied comprise a pair of clamping jaws for gripping the work, a hook needle adapted to draw a loop of cord through the eyelets and thereafter to tie the knot, a looper for guiding the cord into the needle hook, a hook for holding down the loops or bights drawn down by the needle, a gripper and cutter for cutting off and holding the end of the cord, a cord tension to prevent additional cord from being drawn off from the supply, and two take-ups adapted to cooperate with the other knot tying elements to form the knot.

Before starting the machine, the folded upper is placed in position with the needles extending upwardly through the superimposed eyelets. Upon starting the machine, the clamps are caused to clamp the work securely in position, and then the loopers are brought forward to place a loop of cord in each needle hook. The needles are then retracted, each needle drawing a loop of cord through two superposed eyelets, and the upper is moved laterally away from the machine by the movement of the slide on which the work clamping devices are carried. By the cooperation of the knot tying elements, as will be hereinafter more fully described, a bight is taken by a needle in one of the legs of the loop on the upper side of the eyelets and is drawn down through the loop which is then tightened up by taking up the cord forming the second leg of the loop. The needle is then advanced again through the bight thus formed and takes a bight in the second leg of the loop which is now drawn through the first bight which is tightened up by taking up the cord forming the opposite or first leg of the loop. In this manner, two bights are taken alternately in each of the two legs of the original loop extending through the eyelets and are drawn each in turn through the next preceding bight to form a firm unyielding knot.

Referring to the drawings, the hook needle provided with each knot tying device is indicated at 60, the looper at 62, the cord gripper at 64, and a hook for holding the loops or bights drawn down by the needle is indicated at 66. The knot tying devices also include a lower take-up bar 68 extending laterally across the machine and secured at each end to lever arms 70 sleeved on the shaft 72, and an upper take-up bar 74 which is similarly supported on the lever arms 76 on a shaft 78. In order to assist in the locating of the knot as it is formed by the operation of the knot tying devices, a knot locator bar provided at 80 is supported at each end on lever arms 82 which are in turn sleeved on a shaft 84.

The folded upper is held in position in the machine during the knot tying operation by means of a clamping device which comprises a series of lower clamping members 86 formed on the upper end of vertically situated plungers 88 which are mounted to slide in a frame 90 and are pressed yieldingly upward by means of the compression springs 92 coiled about the plungers and resting at their lower ends against a portion of the frame and at their upper ends against corresponding collars 94 on the plungers.

When the machine is in rest position, the clamping members 86 and plungers 88 are held in a retracted position by means of a latch plate 96 formed on the forward end of a lever 98 which is sleeved on the shaft 100 on the machine frame. The latch plate 96 is provided with a ledge 102 which is adapted to engage with a series of collars 104 formed on the lower ends of the plungers 88. The latch lever 98 is held in a retracted position, when the machine is at rest, to hold the lower clamp members 86 in a depressed position against the pressure of their springs by the engagement of a cam roll 106 mounted on the latch lever 98 with a corresponding cam groove in the cam disk 108 on the main cam shaft 109 of the machine.

The corresponding upper clamp for holding the upper in position comprises a bar 110 which extends laterally of the machine and is supported at each end on lever arms 112 secured to short stub shafts 114 which are rotatably mounted at each side of the machine in the frame 90.

In order to enable the upper to be moved laterally to bring the superimposed edges of the upper out of the path of the needle movement during the knot tying operation, the frame 90 is supported on two horizontal bars 116 which extend rearwardly in the machine and are mounted to slide axially. The mechanism for moving the frame 90 and clamps away from the knot tying devices comprises the levers 118 at each side of the machine which are formed on sleeves 120, Fig. 1, to turn on the shaft 122. The sleeves 120 are further provided with forwardly extending arms 124 which are engaged at their under sides by the spring pressed plungers 126 which tend to rotate the sleeves 120 and the lever arms 118 in a clockwise direction, as shown in Fig. 17, to hold the frame 90 and the clamping devices in a retracted position toward the knot tying devices. In order to advance the frame against the pressure of the spring pressed plungers 126, a sleeve 128 is interposed between the two sleeves 120 on the rock shaft 122 and is provided at each end with the short lever arms 130 which carry adjustable set screws 132 adapted to engage with the upper side of the arms 124. A downwardly extending cam lever 134 formed on the sleeve 128 is provided at its lower end with a cam roll 136 adapted to engage a corresponding cam formed in the face of the cam disk 138 on the main cam shaft 190 of the machine. As the cam lever 134 is moved inwardly, or to the right, as shown in Fig. 17, the lever arms 130 and set screws 132 are depressed into contact with the arms 124 to rotate the sleeves 120 and levers 118 in a counterclockwise direction, to move the frame 90 and the clamping devices away from the stitch forming devices.

The upper clamping bar 110 and lever arms 112 are normally held raised in rest position by means of a spring 140 which is coiled about the shaft 114 and is attached at one end to the lever arm 112 and at its other end to a fixed point on the machine frame. In order to move the upper clamping bar 110 downwardly toward the lower spring pressed clamp members 86, a short depending member 142 is secured to the outer end of each rock shaft 114 and is provided with a cam surface 144 which is adapted to be engaged by a roll 146 on one arm of a bell crank lever 148 pivoted at 150 on the frame 90, one such lever being mounted on each side of the frame below the corresponding lever 112. The other arm of each bell crank lever 148 is similarly provided with a roll 152 which rides in a groove 154 formed in the forward end of a clamp actuating lever 156 loosely sleeved at each side of the machine on the shaft 158. There is also formed on the hub of each lever 156 a downwardly extending arm 160 provided with a gear segment 162 which meshes with a corresponding gear segment 164 formed on an upwardly extending arm of a cam lever 166 which at its free end carries the cam roll 167 which engages with a corresponding cam groove 168 in the face of the cam disk 169. After the upper has been placed in position on the needles and the machine has been put in operation, the clamp actuating lever 156 is depressed under the influence of its cam through the connections above described, causing the bell crank lever 148 to be rotated in a clockwise direction about its pivot, and through the engagement of the roll 146 with the cam surface 144 causing the upper clamping bar 110 to be moved downwardly into clamping position against the pressure of its spring 140. As the cam roll 146 moves to its furthest position to the right, as clearly shown in Fig. 18, past the line of centers of the pivot 150 and the rock shaft 114, the clamp is automatically locked in its depressed position.

At the same time that the upper clamp is moved down into clamping position, the latch lever 98 is raised, allowing the lower clamping members 86 to move upwardly under the pressure of their springs 92 into yielding engagement with the upper clamping member 110. At the end of the knot tying operation, when the frame 90 and the clamps are returned to their original positions, the latch lever 98 is again depressed, bringing the ledge 102 into engagement with the collars 104 to move the lower clamping members 86 downwardly against the pressure of their springs 92.

With the present machine, a number of loop tying units is provided corresponding to the number of pairs of eyelets in the upper and are adapted to act simultaneously to put individual lacings in the eyelets. Each unit comprises a block or panel 170 in which is mounted a needle, a looper, and a thread gripper.

A straight hook needle 60 is mounted to move vertically in bearings formed in two forwardly extending brackets 172 which comprise an integral part of each panel 170. Vertical reciprocatory movements are imparted to the needles of the several units in unison by means of a horizontally arranged cam lever 174 which is centrally located in the machine to turn on a shaft 176 and at its forward end is provided with a sleeve portion 177 adapted to receive a rod 179 which is connected at each end to the lower ends of two corresponding links 178. At their upper ends, the links are secured to opposite ends of a rod 180 which extends transversely of the machine and is journaled through a series of blocks 182 which are clamped to the needles and are adapted to ride in corresponding guideways 184 formed on the front edges of the panels 170. The needles are advanced and retracted as a unit through the movement of the lever 174 which is provided intermediate its length with an offset portion 186 forming a support for a cam roll 188 adapted to ride in a groove formed in the face of the cam disk 108. With the construction and arrangement of the parts here disclosed, it will be seen that the needles will be advanced and retracted as a unit under the influence of the cam lever 174 and may further be adjusted laterally with the panels 170 to fit the width of the eyelets through which lacings are being inserted.

After each knot tying operation, the end of the cord leading from the supply to each knot tying unit is cut, and the loose end is held securely by means of the cord gripper 64 which is best shown in detail in Figs. 4 and 8. The cord gripper comprises the hook-shaped member on the forward end of a rod 192 which extends rearwardly through the panel 170. Each gripper rod 192 is provided near its rear end with a flanged collar 194 which engages between two bars 196 which run transversely of the machine and are supported at each end by two vertically situated lever arms 198 which are secured by set screws 199 to a rock shaft 176 which is further provided with a downwardly extending arm 200 provided with a cam roll 202 adapted to ride in a cam groove in the face of the disk 204. Cooperating with the gripper 64 is a spring pressed plunger 206 which is mounted in a recess 208 in the panel 170 and is adapted to engage with the hook portion of the gripper as this is retracted to cut and grip the thread. A second cooperating gripping surface 209 is provided to cooperate with the gripper 64 and is formed on the lower end of a short bar or plate 210 which is adapted to slide vertically in a corresponding groove formed in the front of the panel 170. A screw bolt 212 extending through a slot 213 in the plate 210 holds the plate in position and a spring 214 mounted in a recess 215 in the front of the panel engages the upper end of the plate 210 to hold the gripping surface 209 yieldingly in engagement with the upper surface of the gripper 64. The cutting surface 216 is provided in the panel on the under side of the gripper and cooperates with the lower edge of the gripper to sever the cord. At the end of the knot tying operation, the gripper is advanced through the connections above described, releasing the end of the old cord and taking the end of the cord leading from the supply which is severed against the cutting surface 216 as the gripper is retracted to the position shown in Fig. 4, while the loose end is at the same time gripped tightly between the gripping surfaces above described preparatory for the next knot tying operation.

A looper 62 is provided with each knot tying unit and comprises a depending arm which is rigidly secured to the forward end of a bar 217 journaled in the panel 170. At the lower end of the looper arm on the left side as seen, for instance, in Fig. 22, a guide 218 is provided for the cord leading from the supply, and on the right side of the looper is provided a downwardly facing notch or hook 219 which is adapted to receive and guide into the needle hook the cord forming the second leg of the lacing loop which leads over the lower take-up 68 to the gripper 64. In order to give to the looper the advancing and lateral movements necessary to lay cord in the needle hook, each looper bar 217 is provided at its rear end with an offset section 220 having a flanged collar 221 which engages between two parallel bars 222 extending laterally across the machine and supported at each end on two horizontally situated levers 223. These levers 223 are pivotally secured intermediate their lengths to the two arms of a vertically arranged yoke 224, which is loosely sleeved to a shaft 226 and is further provided with a downwardly extending arm 228 which carries the cam roll 230 to engage with a corresponding groove in the face of the cam disk 108. The levers 223 are oscillated about their pivot on the cam yoke 224 to raise and lower the bars 222 and thus to impart lateral movements to the loopers through connections comprising a link 236 which is forked at its upper end, the arms of the fork being connected respectively to the rear ends of the two levers 223. At its lower end, the link 236 is connected to a horizontally arranged cam lever arm 238 which is loosely sleeved on the shaft 176, and is provided with a downwardly extending arm 240 which carries a cam roll 242 adapted to ride in a cam groove formed in the face of the cam disk 204.

Each hook 66 for holding the bights of cord pulled down by the needles in forming the knot, as best shown in Figs. 4 and 10, is formed on the forward end of a rod 246 which is journaled in the panel 170 and is provided at its rear end with a flanged collar 248 which engages between two bars 250 extending laterally of the machine. These bars are supported at each end on the two arms of a vertically situated yoke 252 which is loosely sleeved on the shaft 176 and is further provided with a downwardly extending arm 254 which carries a cam roll 256 adapted to engage in a corresponding cam groove formed in the cam disk 138.

The knot locator bar 80 which is brought to rest position during the knot tying operation, extends laterally across the machine and is supported at each end on the forwardly extending lever arms 82 which are secured at each end of the shaft 84, as above described. The shaft 84 and the lever arms 82 are rotated to raise and lower the locator bar 80 through connections which comprise a depending arm 266 which is connected to the forward end of a link 268. The link is connected also to the upper end of a vertically arranged lever 270 which is loosely sleeved on the shaft 100 and is provided with a depending arm 272 which carries a cam roll 274 adapted to ride in a corresponding groove in a cam disk 169.

The machine is also provided with a series of tensioning devices to control the supply of cord to each loop forming and knot tying device. Each of these tensioning devices comprises a stud 278 over which the cord is guided between a disk 280 and a disk 282 loosely held on the stud 278 and forced yieldingly into engagement with the fixed disk 280 to tension the cord by means of a compression spring 284 coiled about the stud 278 and inserted between the movable disk 282 and a collar 286 rigidly secured to the roll. In order to release the tension on the cord passing over the stud 278, wedges 288 are mounted on a laterally extending bar 290 and are adapted to be inserted between each pair of disks 280 and 282 to spread the disks against the pressure of the springs 284 and thus to release the tension on the cord. In order to control the operation of the tensioning devices, two rearwardly extending arms 292 are formed on the sleeve portions of the lever arms 82 supporting the locator bar 80 and are adapted to engage with the lower ends of two downwardly extending rods 294 formed on each end of the cross bar 290 carrying the wedges 288. Two compression springs 296 coiled about the rods 294 and secured at their lower ends to the rods and at their upper ends adapted to bear against fixed portions of the machine frame tend to hold the rods 294 depressed into engagement with the arms 292 and with the wedges 288 depressed out of contact with the tensioning disks 280 and 282. With this construction and arrangement of the parts, it will be seen that the movement of the lever arms 270 to raise the locator bar 80 into operative position will cause the bar 290 carrying the wedges 288 to be depressed to place the required tension on the cord. Conversely, the movement of the locator bar downwardly into inoperative position causes the rods 294 and bar 290 to be raised against the pressure of the springs 296, causing the wedges 288 to be inserted between the tensioning disks to release the tension on the cord.

The machine is further provided with two take-up devices, one of which is adapted to take up the cord coming from the tensioning device and cord supply forming one leg of the lacing loop drawn through the eyelets in forming the lacing. The other or lower take-up is adapted to take up the cord terminating in the gripper and forming the other leg of the lacing loop. The lower take-up, as above pointed out, comprises the take-up rod 68 which extends laterally of the machine and is supported at each end on a lever arm 70 rigidly secured to the shaft 72. At the left-hand end of the shaft, as shown in Figs. 1 and 17, there is also secured a lever arm 304 which is connected by means of a link 306 to the free end of a cam lever 308 which is loosely sleeved on the shaft 226 and is further provided with a downwardly extending arm 310 provided with a cam roll 312 adapted to ride in a cam groove formed in the face of the disk 204.

The upper take-up, as above pointed out, similarly comprises the take-up rod 74 extending transversely of the machine and supported at each end by the lever arm 76 loosely sleeved on the shaft 78 mounted on the machine frame. There is also secured to the sleeve portion of one of the arms 76 a short lever arm 322 which is connected by means of a link 324 to the free end of a cam lever 326 loosely sleeved on the shaft 100 and provided with a downwardly extending arm 328 which carries a cam roll 330 adapted to engage in a cam groove formed in the face of the cam disk 204.

Since the knot tying units including the needles must be accurately registered with the eyelets in the upper to be operated upon, it is necessary to provide mechanism for adjusting these units laterally with relation to each other to secure the desired spacing. To this end, the panels 170 are mounted for movement transversely of the machine and are further controlled through mechanism about to be described to maintain equal distances between the panels at all times. This mechanism comprises a series of spacing members or wedges which are mounted above and beneath the panels and are positioned to narrow or widen the distance between each two panels as required. At the upper ends of the panels 170 are provided spacing members 334 provided on their under sides with wedge-shaped projections 336 adapted to engage with corresponding rolls 338 pivotally secured on the upper edges of the panels. The members 334 are supported for movement transversely of the machine and also for an advancing and retracting movement on two bars 340 which are provided with corresponding transverse slots formed in the upper edges of the panel 170 and are rigidly secured at each end to the machine frame. A rack 342 is formed on the upper surface of each of the members 334 and meshes with a corresponding pinion 344 secured to the shaft 346 journaled in the machine frame and extending across the width of the machine.

A series of spacing members 348 are similarly mounted directly beneath the panels 170 to slide transversely and forward and back in the machine on a platform 350 and are held in position in contact therewith by means of a bar 352 received in transverse slots formed in the lower edges of the panels 170. Each of these spacing members 348 is provided with two wedge-shaped projections 354 which are adapted to engage between corresponding rolls 356 mounted on the under sides of the panels 170. A rack 358 is formed on the under side of each of the members 348 and is adapted to engage with a pinion 360 extending laterally of the machine and secured to turn on a shaft 362 journaled in the fixed portion of the machine frame. In order to hold the upper and lower spacing members 334 and 348 with their V-shaped projections at all times in contact with the rolls 338 and 356 on the panels 170 to secure the proper spacing of the knot-tying units, compression springs 364 are seated in recesses 366 in the machine frame, as indicated in Fig. 12, and are adapted to bear against the right-hand end panel 170, as best shown in Fig. 12. The shafts 346 and 362 with the pinions 344 and 360 are rotated to advance or retract the spacing members 334 and 348 to separate or bring together the knot-tying units through connections which comprise a lever 368 which is secured to a short pivot shaft 370 and at its upper end is provided with a gear segment 372 which meshes with a corresponding gear 374 on the shaft 346, and at its lower end is provided similarly with a gear segment 376 which meshes with a corresponding gear 378 on the shaft 362. A hand crank 380 secured to the end of the pivot shaft 370 provides the operator a manual means for rotating the pivot shaft 370 to effect this adjustment.

The operation of the machine is as follows:

With the machine in rest position, as shown in Fig. 17, the needles are in advanced position, the looper, hook, and gripper are retracted, the frame 90 carrying the clamping devices is in its retracted position, the upper clamping jaw is in raised position and the lower clamping jaws are held in a retracted position to facilitate the placing of the eyelets of the folded upper over the needles preparatory to starting the machine. The knot tying units are now adjusted by the operator to register with the eyelets of the upper by turning the crank 380 for rotating the pinions 344 and 360 to advance or retract the spacing members 334 and 348, and the upper is placed in position with the needles extending upwardly through each pair of superimposed eyelets.

Upon starting the machine, the lever 142 is depressed and acts through the bell crank lever 148 to move the upper clamping bar 110 down into clamping position against the pressure of its spring 140 where it is locked by the bell crank lever 148. At the same time, the lever 93 is raised, carrying with it the latch member 96 and allowing the lower clamping jaws 86 to be raised under the influence of their springs 92 to clamp the work yieldingly between the jaws. The looper is now advanced and moved laterally past the needle to lay a loop of cord in the needle hook. At this time, the cord end is securely held by the gripper 64 and the thread tensioning devices cooperating with each knot tying unit are released to permit the requisite amount of cord for the new lacing to be drawn from the supply. The several steps thus far described in the operation of the machine are illustrated in Figs. 18 to 24 inclusive. Succeeding Figs. 25 to 53 inclusive illustrate in detail the successive steps in the operation of the knot tying devices to form the lacing and tie a firm unyielding knot. As illustrated in the drawings, the needle is now retracted to draw a loop of cord through the eyelets and the upper and lower take-up devices are both raised to their utmost limits to draw off a sufficient amount of cord from the supply to form the lacing. This movement of the lower take-up also causes the length of thread leading from the needle to the gripper to be engaged by the notch 219 in the looper arm. The clamp support 90 carrying the upper is now advanced away from the knot tying devices preparatory to the formation of the knot, the lower take-up at this time being brought down to give up sufficient cord for this purpose without the necessity of reeving the cord through the eyelets and the needle hook, the upper take-up remaining at this time in its upper position. The knot locating bar 80 is now raised to its operative position, as shown in Fig. 27, and the tensioning devices are simultaneously rendered operative to prevent further cord from being drawn off from the supply. The parts are now in position for the formation of the knot. At this time, the hook 66 is advanced and slightly retracted to take the loop from the needle and the needle is advanced through the loop held down in this fashion. The looper is now moved to the right, as shown in Fig. 30, to bring the leg of the loop leading from the supply into the needle hook and the needle is then retracted, causing a bight of cord to be drawn through the loop held on the hook member 66. At the same time, the upper take-up member is depressed to give up a corresponding amount of cord for this purpose. The hook member is now advanced to release the first loop, as shown in Fig. 32 and the lower take-up bar 68 is raised to take up the cord on the leg of the loop leading to the gripper and thus to tighten up the loop, as shown in Fig. 32. The hook 66 is again retracted to take the bight of cord from the needle hook which is now advanced to its upper position as shown in Figs. 34 and 35. At the same time, the looper is moved to the left, as shown in Fig. 34, to cause the leg of the loop leading from the eyelet through the notch 219 of the looper to the gripper to be brought into the needle hook. The needle is then retracted, causing a bight to be formed in the gripper leg of the loop and drawing this bight of cord through the first bight, as shown in Fig. 36, the lower take-up at the same time being depressed to provide the requisite cord for this purpose. The hook 66 is now advanced to release the first bight formed in the leg of the loop leading from the supply and the upper take-up is raised to take up the cord on the supply leg of the loop and thus to tighten the bight formed in this leg of the loop about the second bight now held on the needle hook, as best shown in Fig. 37. At this stage in the formation of the knot, it will be noted that one bight has been taken in each leg of the original loop passing through the eyelets, the first bight being passed through the loop itself and the second bight in the second leg of the loop being passed through the first bight. Preparatory to the next step in the formation of the knot, the hook 66 is again retracted to take the bight held on the needle hook, the needle again being advanced, as shown in Fig. 39. The looper is now moved to the right, as shown in Fig. 40, to bring the cord forming the supply leg of the original loop into the path of the needle hook which acts on the retracting stroke of the needle to form a second bight of cord in the leg of the original loop leading from the supply and to pass this bight through the bight held on the hook 66, as shown in Fig. 41. The upper take-up is at the same time depressed to provide the requisite cord for this purpose. The hook 66 is again advanced to release the bight held thereon and the lower take-up 68 is raised to tighten up this bight formed in the gripper leg of the original loop about the bight held on the needle hook, as best shown in Fig. 42.

In order to form a tight knot which will not become loosened or untied, a fourth bight is now taken in the cord on the gripper leg of the loop and is pulled through the bight last formed in the supply side of the original loop which is then tightened to complete the formation of the knot. As shown in Fig. 43, the third bight held on the needle hook is taken by the hook 66 and the needle is advanced through the loop to take the cord passing over the lower take-up to the gripper. The needle is now retracted, drawing the fourth bight through the previously formed bight held on the hook 66, the hook is advanced to release this bight, and the upper take-up is raised, as indicated by the arrows in Figs. 46 to 49 inclusive to tighten up the third bight about the fourth bight. Finally, the thread gripper is advanced, releasing the end of the old cord, and moving into position to engage with the cord leading from the knot to the supply while at the same time, the upper take-up is retracted to allow the cord to be readily drawn off by the gripper in its retracting movement to sever the cord and to grip the free end.

The method of lacing shoe uppers herein disclosed forms the subject-matter of a divisional application Serial No. 724,916 filed May 10, 1934.

The invention having been described, what is claimed is:

1. A machine for lacing a shoe upper having, in combination, means for supporting the upper and means for tying a knot to secure the edges of the upper together which comprises a hook needle, a looper adapted to loop cord about the needle hook in its advanced position, a member adapted to hold the loop pulled by the needle and means for advancing the needle through the said loop to take a new loop.

2. A machine for lacing a shoe upper having, in combination, means for supporting the upper and means for tying a knot to secure the edges of the upper together which comprises a hook needle, a looper adapted to loop cord about the needle hook in its advanced position, a member adapted to hold the loop pulled by the needle, means for advancing the needle through the said loop to take a new loop, and a take-up to tighten up the first loop formed.

3. A machine for lacing a shoe upper having, in combination, means for supporting the upper and means for tying a knot to secure the edges of the upper together which comprises a hook needle, a looper adapted to loop cord about the needle hook in its advanced position, means for advancing the needle to take and draw a new loop through a loop previously drawn by the needle, and take-up means for tightening the previously drawn loop.

4. A machine for lacing a shoe upper having, in combination, means for supporting the upper and means for tying a knot to secure the edges of the upper together which comprises a thread supply from which thread is drawn to form the knot, a hook needle, a looper adapted to loop cord about the needle hook in its advanced position, a hook member adapted to hold the loop during the advancing movement of the needle to take a new loop, a thread gripper to hold the end of the lacing cord, a take-up adapted to engage with the thread adjacent to the gripper, and a second take-up adapted to engage the thread between the looper and the thread supply.

5. A machine for lacing a shoe upper having, in combination, means for supporting the upper and means for tying a knot to secure the edges of the upper together which comprises a thread supply from which the thread is drawn to form the knot, a hook needle, a looper adapted to loop cord about the needle hook in its advanced position, a gripper for holding the loose end of the cord, a take-up adapted to engage the cord adjacent the gripper, a second take-up adapted to engage with the supply side of the cord, means for actuating the looper to cause the needle when advanced to engage one or the other of the cord portions forming the legs of the first loop, and means for actuating the take-ups to take up the next preceding loop.

6. A machine for lacing a shoe upper having, in combination, means for supporting the upper, and means for tying a knot to secure the edges of the upper together which comprises a thread supply from which the thread is drawn to form the knot, a hook needle, a looper adapted to loop cord about the needle hook in its advanced position, means for holding down a loop during the advancing movement of the needle to take a new loop, a guide on the looper to maintain the relative positions of the cord portions forming the legs of the first loop, and means for actuating the looper to cause first one and then the other of said cord portions to be engaged by the needle.

7. A machine for lacing a shoe upper having, in combination, a clamp for supporting the upper, a hook needle adapted to extend through the superimposed eyelets of a folded upper, a cord clamp for holding the end of the cord, means acting after the first loop drawing movement of the needle to move the upper laterally with relation to the needle to enable the needle to engage the legs of the loop pulled through the upper coming respectively from the supply and from the clamp, a looper for guiding a cord into the needle hook, a take-up adapted to act on each leg of the cord loop, and means for actuating the looper during the continued reciprocation of the needle to cause the needle upon successive reciprocations to engage with and form loops alternately in each leg.

8. A machine for lacing a shoe upper having, in combination, a clamp for supporting the upper, a hook needle adapted to extend through the superimposed eyelets of a folded upper, a cord clamp for holding the end of the cord, means acting after the first loop drawing movement of the needle to move the upper laterally with relation to the needle to enable the needle to engage with the two legs of the loop pulled through the upper and coming respectively from the supply and from the clamp, a looper for guiding a cord into the needle hook, a take-up adapted to act on each leg of the cord loop, means for actuating the looper during the continued reciprocation of the needle to cause the needle upon successive reciprocations to engage with and form loops alternatively in each leg of the cord loop, and means for actuating the take-ups to pull in each preceding loop.

9. A machine for lacing a shoe upper having, in combination, a clamp for supporting the upper, a hook needle adapted to extend through the superimposed eyelets of a folded upper, means acting after the first loop drawing movement of the needle to move the upper laterally with relation to the needle to enable the needle to move freely past the edges of the folded upper, a looper adapted to lead the cords forming the two legs of the first loop alternately into the path of the needle hook, and mechanism cooperating with the needle to cause each loop in turn to be drawn through the preceding loop.

10. A machine for lacing a shoe upper having, in combination, a support for the shoe upper, a hook needle adapted to draw a loop of cord through a pair of eyelets, a looper adapted to lead the cords forming the two legs of the first loop alternately into the path of the needle hook, and mechanism cooperating with the needle to cause each loop in turn to be drawn through the preceding loop.

11. A machine for lacing a shoe upper having, in combination, a clamp for supporting the upper, a hook needle adapted to extend through the superposed eyelets of a folded upper, means acting after the first loop drawing movement of the needle to move the upper laterally with relation to the needle to enable the needle to move freely past the edges of the folded upper, a looper adapted to lead the cords forming the two legs of the first loop alternately into the path of the needle hook, a hook member adapted to hold the loop during the advancing movement of the needle to take a new loop, a knot locating member over which each successive loop is pulled by the needle, and take-up mechanism adapted during the pulling of each successive loop to tighten up the preceding loop through which it is drawn.

12. A machine for lacing shoe uppers having, in combination, a plurality of needles, supports on which the needles are mounted adapted for movement to space the needles in accordance with the spacing of the eyelets to be laced, spacing members movable with the supports and provided with wedge-shaped projections engaging between the supports, and means for moving said spacing members to vary the said spacing.

13. A machine for lacing shoe uppers having, in combination, a plurality of needles, supports on which the needles are mounted adapted for movement to space the needles in accordance with the spacing of the eyelets to be laced, spacing members movable with the supports and provided with wedge-shaped projections engaging between the supports, spring means tending to move the supports together to hold the supports and spacing members in contact, and means for advancing and retracting the spacing members to vary the spacing of the needles.

14. A machine for lacing shoe uppers having, in combination, a plurality of needles, supports on which the needles are mounted adapted for movement to space the needles in accordance with the spacing of the eyelets to be laced, spacing members situated above and beneath supports and movable therewith and provided with wedge-shaped projections to engage between the supports, means for yieldingly holding the supports and spacing members in contact, and means for advancing and retracting the spacing members to vary the spacing of the needles.

15. A machine for lacing a shoe upper having, in combination, a main frame, a plurality of needles arranged to pass a series of individual cord loops through aligned eyelets of a folded shoe upper, supports mounted in the frame on which the needles are mounted adapted for movement to space the needles in accordance with the spacing of the eyelets to be laced, devices cooperating with the needles, and means for actuating each needle and the devices cooperating therewith to pass a cord loop across the edges of the shoe upper and through the preceding loop of the same cord, and thereafter to pass a portion of the same cord through the second loop.

16. A machine for lacing a shoe upper having, in combination, a plurality of needles arranged to pass a series of individual cord loops through aligned eyelets of a folded shoe upper, devices cooperating with the needles, means for actuating each needle and the devices cooperating therewith to pass a cord loop across the edges of the shoe upper and through the preceding loop of the same cord, and thereafter to pass a loop of the same cord through the second loop, means for taking up on each cord to tighten the loops, and means for producing sufficient slack in the lacing to permit opening out of the upper for application to a last.

17. In a machine for lacing a shoe upper having a normal starting position with the needle extending through the plane of the work, the combination of, a needle arranged, while stationary, to extend through aligned eyelets of a folded shoe upper placed thereon and to pass a cord loop through the eyelets, devices cooperating with the needle, and means arranged to be put in operation after the upper has been placed on the needle for actuating the needle and the devices cooperating therewith to pass a cord loop across the edges of the shoe upper and through the preceding loop, and thereafter to pass a portion of the same cord through the second loop.

18. In a machine for lacing a shoe upper having a normal starting position with the needle, extending through the plane of the work, the combination of, a needle arranged, while stationary, to extend through aligned eyelets of a folded shoe upper placed thereon and to pass a cord loop through the eyelets, devices cooperating with the needle, and means arranged to be put in operation after the upper has been placed on the needle for actuating the needle and the devices cooperating therewith to pass a cord loop across the edges of the shoe upper and through the preceding loop, and thereafter to pass a cord loop through the second loop, and means for taking up on the cord to tighten the loops successively.

19. A machine for lacing a shoe upper having, in combination, a plurality of needles arranged to pass a series of individual cord loops through aligned eyelets of a folded shoe upper, means for imparting a plurality of reciprocations to the needles, and means for relatively moving the needles and upper to cause the needles to reciprocate across the edges of the upper and each needle to pass a cord loop through a loop of the same cord extending through the eyelets and thereafter to pass a loop of the same cord through the second loop.

20. In a machine for lacing a shoe upper having a normal starting position with the needle extending through the plane of the work, the combination of, a needle arranged, while stationary, to extend through aligned eyelets of a folded shoe upper placed thereon, a clamp for holding the upper in position after being placed on the needle, means arranged to be put in operation after the upper has been placed on the needle for withdrawing the needle from the eyelets while the upper is clamped and for imparting to the needle a plurality of reciprocations to pass a cord loop across the edges of the upper and through the preceding loop during one reciprocation and thereafter to pass a cord loop during another reciprocation through the second loop.

21. In a machine for lacing a shoe upper having a normal starting position with the needles extending through the plane of the work, the combination of, a series of needles arranged, while stationary, to extend through aligned eyelets of a folded shoe upper placed thereon, a clamp for holding the upper in position after being placed on the needles comprising a clamping member to engage one side of the upper, and a series of clamping members to engage the other side of the upper, means arranged to be put in operation after the upper has been placed on the needles for withdrawing the needles from the eyelets while the upper is clamped and for imparting a plurality of reciprocations to the needles across the plane of the clamped shoe upper, and devices cooperating with the needles to form a series of individual cord lacings extending through the eyelets and across the edges of the folded upper.

22. In a machine for lacing a shoe upper having a normal starting position with the needles extending through the plane of the work, the combination of, a series of needles arranged, while stationary, to extend through aligned eyelets of a folded shoe upper placed thereon, a clamp for holding the upper in position after being placed on the needles comprising clamping members arranged to engage opposite sides of the upper, means for holding said clamping members out of clamping position to facilitate placing the upper on the needles, means for actuating the clamping members to engage the upper, means arranged to be put in operation after the upper has been placed on the needles for withdrawing the needles from the eyelets while the upper is clamped and for imparting to the needles a plurality of reciprocations across the plane of the clamped shoe upper, and devices cooperating with the needles to form a series of individual cord lacings passing through the eyelets and across the edges of the upper.

23. In a machine for lacing a shoe upper having a normal starting position with the needles extending through the plane of the work, the combination of, a series of needles arranged, while stationary, to extend through aligned eyelets of a folded shoe upper placed thereon, a clamp for holding the upper in position after being placed on the needles comprising clamping members engaging opposite sides of the upper, means arranged to be put in operation after the upper has been placed on the needles for withdrawing the needles from the eyelets while the upper is clamped and for imparting to the needles a plurality of reciprocations across the plane of the clamped shoe upper, devices cooperating with the needles to form a series of individual cord lacings extending through the eyelets and across the edges of the upper, and means for separating the clamping members to release the upper after being laced.

24. In a machine for lacing a shoe upper having a normal starting position with the needles extending through the plane of the work, the combination of, a series of needles arranged, while stationary, to extend through aligned eyelets of a folded shoe upper placed thereon, a clamp for holding the upper in position after being placed on the needles comprising a clamping bar to engage one side of the upper and a series of yieldingly mounted clamping members engaging the opposite side of the upper, means for actuating the clamping members to clamp the upper after being placed on the needles, means arranged to be put in operation after the upper has been placed on the needles for withdrawing the needles from the eyelets while the upper is clamped and for imparting to the needles a plurality of reciprocations across the plane of the clamped shoe upper, and devices cooperating with the needles to form a series of individual cord lacings extending through the eyelets and across the edges of the folded upper.

25. A machine for lacing eyeletted shoe uppers having, in combination, a plurality of needles arranged to pass a series of individual cord loops through aligned eyelets of a folded shoe upper and across the edges of the upper, means for imparting a plurality of reciprocations to the needles, means for relatively moving the needles and upper to cause the needles to reciprocate across the edges of the upper and each needle to pass a cord loop through a loop of the same cord extending through the eyelets and thereafter to pass a loop of the same cord through the second loop, a cord end gripper associated with each needle to hold the end of the cord while the lacing is being formed by the loops, means for actuating the gripper to release the cord end after the formation of the lacing by the loops and to grip the cord between the lacing and the supply, and means for thereafter severing the cord between the gripper and the lacing.

26. A machine for lacing eyeletted shoe uppers having, in combination, a plurality of needles arranged to pass a series of individual cord loops through aligned eyelets of a folded shoe upper and across the edges of the upper, means for imparting a plurality of reciprocations to the needles, means for relatively moving the needles and upper to cause the needles to reciprocate across the edges of the upper and each needle to pass a cord loop through a loop of the same cord extending through the eyelets and thereafter to pass a loop of the same cord through the second loop, and means for severing the cords to separate the individual lacings from the supply.

JOSEPH FOSSA.
HARRY D. ELLIOTT.